O. M. NELSON.
SYRUP COOKER.
APPLICATION FILED JUNE 1, 1917.
1,264,839.
Patented Apr. 30, 1918.
2 SHEETS—SHEET 1.
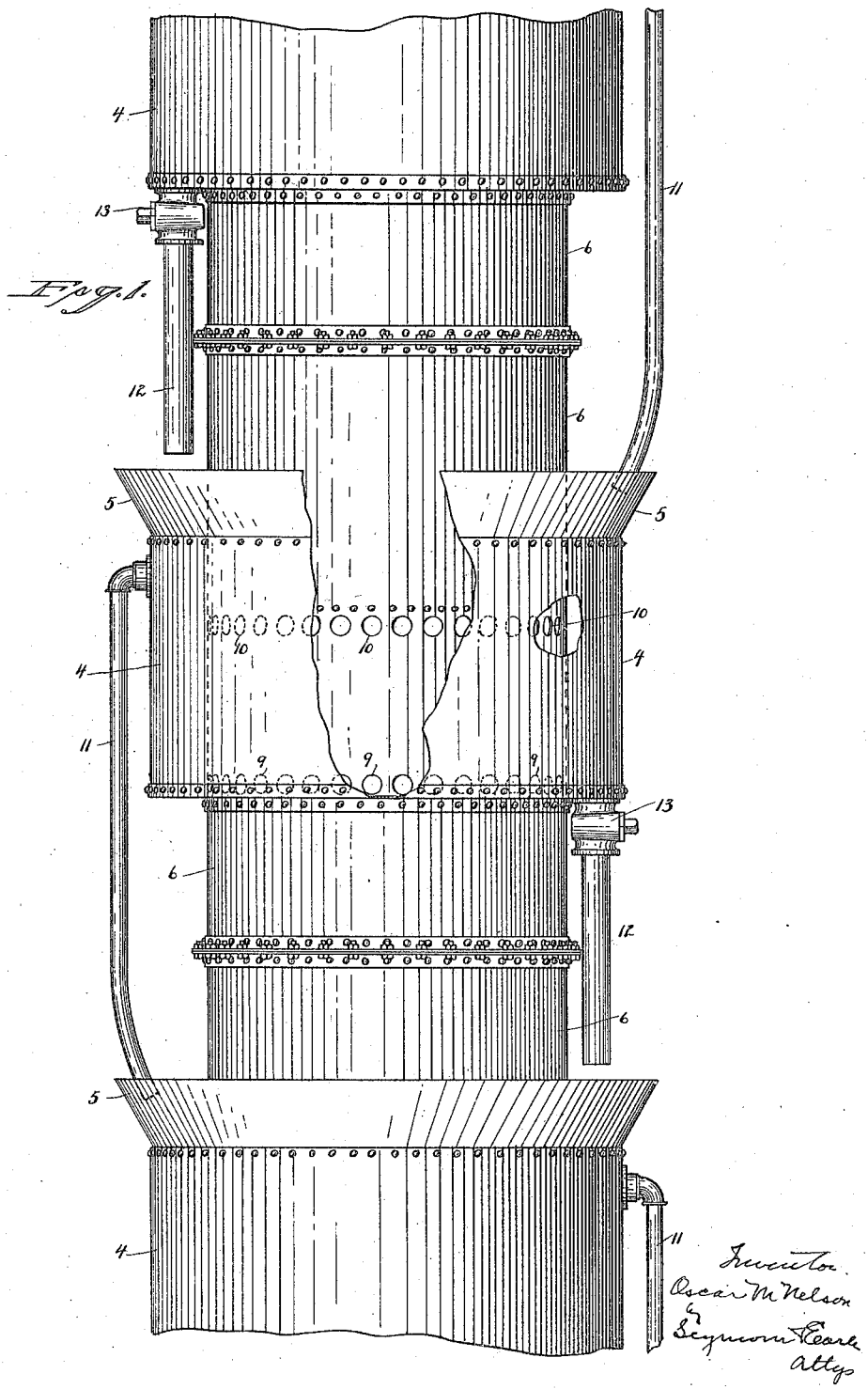

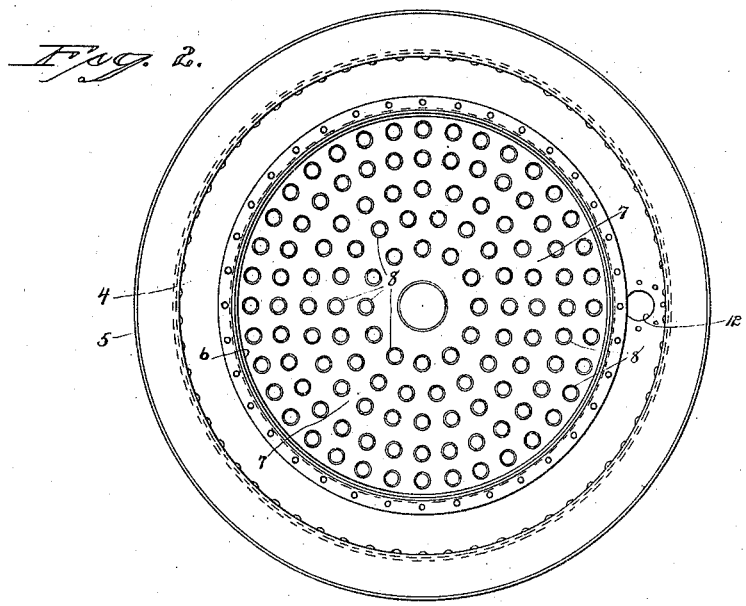
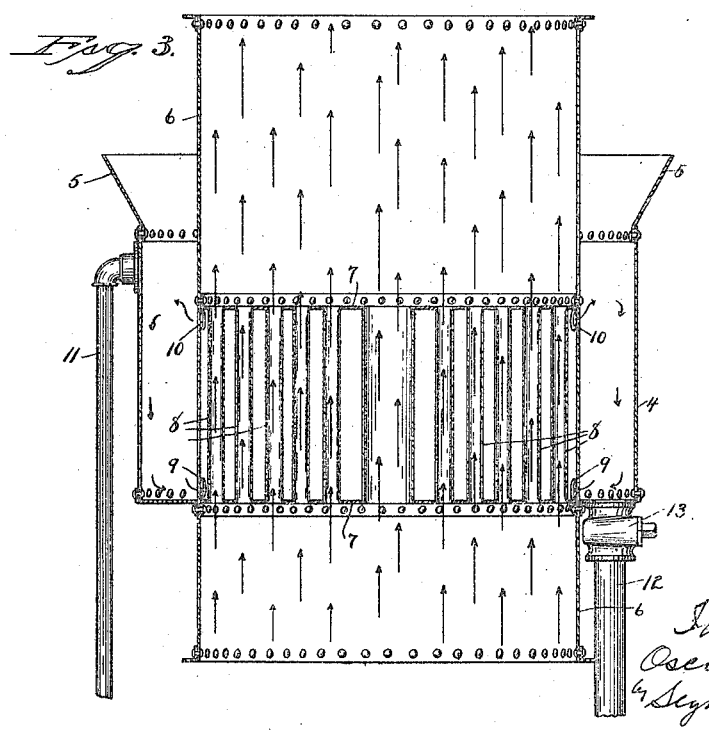

UNITED STATES PATENT OFFICE.

OSCAR M. NELSON, OF NEW HAVEN, CONNECTICUT, ASSIGNOR TO THE UNITED STATES SUGAR CO., OF NEW HAVEN, CONNECTICUT, A CORPORATION.

SYRUP-COOKER.

1,264,839.      Specification of Letters Patent.      Patented Apr. 30, 1918.

Application filed June 1, 1917. Serial No. 172,307.

*To all whom it may concern:*

Be it known that I, OSCAR M. NELSON, a citizen of the United States, residing at New Haven, in the county of New Haven and State of Connecticut, have invented a new and useful Improvement in Syrup-Cookers; and I do hereby declare the following, when taken in connection with the accompanying drawings and the characters of reference marked thereon, to be a full, clear, and exact description of the same, and which said drawings constitute part of this application, and represent, in—

Figure 1 a side view partly broken away illustrating a series of syrup cookers constructed in accordance with my invention, and arranged in stack form.

Fig. 2 a top or plan view of one of the cooker sections.

Fig. 3 a vertical sectional view of the same.

This invention relates to an improvement in syrup cookers such as are employed in cooking the juices from sugar-cane, maple sap, etc., the object being to provide a device by which the syrup may be heated to high temperature without danger of burning, and the invention consists in the construction hereinafter described and particularly recited in the claims.

Preferably I arrange the cookers in a series or stack, Fig. 1 of the drawings indicating three units arranged one above the other. These units each comprise a pan 4 formed with a flaring mouth 5, and extending up through the pan is a flue 6, and in this flue I locate a drum 7 the bottom of which is level with the bottom of the pan 4 and which terminates at a point below the upper edge of the pan. In this drum are a series of tubes 8 connecting the several sections of the flues and through which heat from the furnace, not shown, will pass. In the bottom of the drum are a series of inlet openings 9 and near the top of the drum are a series of outlet openings 10. Opening from a point near the top of each pan and at a point above the upper edge of the drum is a discharge pipe 11 which may discharge into any suitable receptacle or into the pan immediately below it. Each pan will be provided with a drain pipe 12 controlled by a valve 13. Syrup to be cooked will enter the pan from the source of supply or from the uppermost pan in use, and will enter the drum through the inlet openings 9 rising through the drum around the tubes 8 and out through the outlet openings 10, and will again enter the inlet openings 9, and will continue to circulate until it is sufficiently heated. This circulation prevents the material from being burned by heat from the tubes 8. When the syrup rises to the height of the outlet pipe 11 it will overflow and be discharged by that pipe into a suitable receptable, or into the pan immediately below where it will be further cooked, and this may be repeated through any desired number of pans. From the lowermost pan the material to be discharged through the drain pipe 12 and any material remaining in the pans may also be drawn off, when desired.

I claim:

1. A syrup cooker comprising a pan, a flue extending upward through said pan, a drum secured in said flue, a series of vertically arranged flue pipes in the said drum through which heat may pass, inlet openings through the flue into the sides of the drum near the bottom, outlet openings through the flue into the sides of the drum near the top, and a discharge pipe opening from the pan at the top above the upper end of the drum.

2. A syrup cooker comprising a series of pans arranged one above the other, a vertically arranged flue extending upward through the pans, drums secured in the flues the bottoms of the drums coincident with the bottom of the pans, and the length of the drums being less than the depth of the pans, a series of flue pipes extending upward through the drums, inlet openings through the flue into the sides of the drums near the bottoms, outlet openings through the flue into the sides of the drums near the tops, and an overflow pipe opening out of each pan at a point above the upper edge of the drums.

In testimony whereof, I have signed this specification in the presence of two subscribing witnesses.

.OSCAR M. NELSON.

Witnesses:
     C. L. WEED,
     F. C. EARLE.

---

Copies of this patent may be obtained for five cents each, by addressing the "Commissioner of Patents. Washington, D. C."